United States Patent
Noh et al.

(10) Patent No.: US 11,721,055 B2
(45) Date of Patent: Aug. 8, 2023

(54) METHOD AND DEVICE WITH CHARACTER ANIMATION MOTION CONTROL

(71) Applicants: Samsung Electronics Co., Ltd., Suwon-si (KR); Korea Advanced Institute of Science and Technology, Daejeon (KR)

(72) Inventors: Junyong Noh, Daejeon (KR); Kyungmin Cho, Daejeon (KR); Chaelin Kim, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 109 days.

(21) Appl. No.: 17/333,278

(22) Filed: May 28, 2021

(65) Prior Publication Data

US 2022/0245879 A1 Aug. 4, 2022

(30) Foreign Application Priority Data

Feb. 3, 2021 (KR) .................. 10-2021-0015326

(51) Int. Cl.
- *G06T 13/40* (2011.01)
- *G06F 16/43* (2019.01)
- *G06N 3/08* (2023.01)
- *G06T 13/80* (2011.01)

(52) U.S. Cl.
CPC .............. *G06T 13/40* (2013.01); *G06F 16/43* (2019.01); *G06N 3/08* (2013.01); *G06T 13/80* (2013.01)

(58) Field of Classification Search
CPC ......... G06T 13/80; G06T 13/40; G06T 13/00; G06T 2200/24; G06N 3/08; G06N 3/00; G06N 3/045; G06F 16/43; G06F 3/04842; G06F 3/04886; A63F 13/67; A63F 13/573; G06V 10/82; G06V 10/763; G06V 20/00
See application file for complete search history.

(56) References Cited

U.S. PATENT DOCUMENTS

| | | |
|---|---|---|
| 9,827,496 B1 | 11/2017 | Zinno |
| 2018/0165864 A1 | 6/2018 | Jin et al. |
| 2019/0295305 A1 | 9/2019 | Yang et al. |

(Continued)

FOREIGN PATENT DOCUMENTS

| | | |
|---|---|---|
| JP | 2017-188041 A | 10/2017 |
| JP | 2020-149399 A | 9/2020 |

(Continued)

OTHER PUBLICATIONS

Taylor, Graham W., et al., "Modeling Human Motion using Binary Latent Variables." *Advances in neural information processing systems*, 2007 (pp. 1-8).

(Continued)

*Primary Examiner* — Xilin Guo
(74) *Attorney, Agent, or Firm* — NSIP Law (57) ABSTRACT

A character animation motion control method and device are disclosed. A character animation playing method, including extracting first actions based on a state of a character, extracting second actions based on the state, selecting an action included in the first actions and the second actions, and updating the state based on the action.

20 Claims, 6 Drawing Sheets

(56) References Cited

U.S. PATENT DOCUMENTS

| | | | | |
|---|---|---|---|---|
| 2019/0381404 | A1* | 12/2019 | Buttner | ............... G06T 13/00 |
| 2020/0098156 | A1 | 3/2020 | Grant | |
| 2020/0268287 | A1 | 8/2020 | Discenzo | |
| 2020/0293881 | A1* | 9/2020 | Taylor | ................. G06N 3/08 |
| 2020/0324205 | A1 | 10/2020 | Buttner | |

FOREIGN PATENT DOCUMENTS

| | | |
|---|---|---|
| KR | 2002-0095774 A | 12/2002 |
| KR | 10-1014852 B1 | 2/2011 |
| KR | 10-1498610 B1 | 3/2015 |
| KR | 10-2015-0057424 A | 5/2015 |

OTHER PUBLICATIONS

Kovar, Lucas, et al., "Motion Graphs." *ACM SIGGRAPH 2008 classes*. 2008 (pp. 1-10).

Lee, Yongjoon, et al., "Motion Fields for Interactive Character Locomotion." *ACM SIGGRAPH Asia 2010 papers*, 2010 (pp. 1-8).

Holden, Daniel, et al., "A Deep Learning Framework for Character Motion Synthesis and Editing." *ACM Transactions on Graphics (TOG)*, 35, 4, 2016 (pp. 1-11).

Clavet, Simon et al., "Motion Matching road to next-gen animation", *Ubisoft Montreal, Game Developers Conference* Mar. 14-18, 2016 (pp. 1-107).

Holden, Daniel, et al., "Phase-Functioned Neural Networks for Character Control." *ACM Transactions on Graphics (TOG)*, 36, 4, 2017 (pp. 1-13).

Zhang, He, et al. "Mode-Adaptive Neural Networks for Quadruped Motion Control." *ACM Transactions on Graphics (TOG)*, 37, 4, 2018 (pp. 1-11).

Starke, Sebastian, et al. "Neural State Machine for Character-Scene Interactions." *ACM Trans. Graph*, 38, 6, 2019 (pp. 1-14).

Ghorbani, Saeed, et al., "Probabilistic Character Motion Synthesis using a Hierarchical Deep Latent Variable Model." *Computer Graphics Forum*, vol. 39, No. 8, 2020 (pp. 1-15).

Ling, Hung Yu, et al., "Character Controllers using Motion VAES." *ACM Transactions on Graphics (TOG)*, 39, 4, 2020 (pp. 1-12).

Van de Wiele, Tom, et al. "Q-Learning in Enormous Action Spaces via Amortized Approximate Maximization." *arXiv preprint arXiv:2001.08116*, Jan. 22, 2020 (pp. 1-19).

* cited by examiner

METHOD AND DEVICE WITH CHARACTER ANIMATION MOTION CONTROL

CROSS-REFERENCE TO RELATED APPLICATIONS

This application claims the benefit under 35 USC § 119(a) of Korean Patent Application No. 10-2021-0015326 filed on Feb. 3, 2021, in the Korean Intellectual Property Office, the entire disclosure of which is incorporated herein by reference for all purposes.

BACKGROUND

1. Field

The following description relates to method and device with character animation motion control.

2. Description of Related Art

A motion graph is widely used to play an animation in real time. A method using the motion graph may generate an animation by generating an animation graph in advance and playing an animation clip by selecting a graph edge during runtime.

However, such a motion graph-based method may reduce a speed of response of the animation and may require a great amount of manual work to generate a high-quality animation. Although there may be an indirect method that uses a greater quantity of animation data and generates a more complex graph to resolve such a response issue, the indirect method may greatly increase the amount of manual work.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a character animation playing method, including extracting first actions based on a state of a character, extracting second actions based on the state, selecting an action included in the first actions and the second actions, and updating the state based on the action.

The state may include a motion parameter associated with joint information of the character, a binary latent code corresponding to an animation data segment currently playing, a motion instability parameter associated with a stability of a motion change of the character, and a goal parameter associated with a task performed by the character.

The first actions and the second actions may include a binary latent code corresponding to an animation data segment divided by a time unit.

The first actions may include extracting a proposed action from a learned network based on the state and a binary latent code, and extracting the first actions similar to the proposed action using a k-nearest neighbor (KNN) algorithm.

The extracting of the second actions may include extracting the second actions corresponding to the state based on a table for matching transitionable binary latent codes.

The updating may include searching for a binary latent code included in the selected action from an animation database (DB), selecting an animation data segment corresponding to the binary latent code, and updating the state based on the selected animation data segment.

The updating may include calculating the motion instability parameter based on the selected action, and updating the state, in response to the motion instability parameter being less than or equal to a threshold.

The method may include omitting the updating of the state, in response to the motion instability parameter being greater than a threshold.

The method may include generating an animation DB based on original animation data.

The generating may include dividing the original animation data into animation data segments, extracting features corresponding to each of the animation data segments, generating binary latent codes corresponding to the features, clustering the animation data segments based on the binary latent codes, and calculating a mean feature of the animation data segments included in the same cluster.

In another general aspect, there is provided a character animation playing device, including a processor configured to extract first actions based on a state of a character, extract second actions based on the state, select an action included in the first actions and the second actions, and update the state based on the action.

The device may include a motion parameter associated with joint information of the character, a binary latent code corresponding to an animation data segment currently playing, a motion instability parameter associated with a stability of a motion change of the character, and a goal parameter associated with a task performed by the character.

The first actions and the second actions may include a binary latent code corresponding to an animation data segment to be played.

The processor may be configured to extract a proposed action from a learned network based on a binary latent code, and extract the first actions similar to the proposed action using a k-nearest neighbor (KNN) algorithm.

The processor may be configured to extract the second actions corresponding to the state based on a table for matching transitionable binary latent codes.

The processor may be configured to search for a binary latent code included in the selected action from an animation database (DB), select an animation data segment corresponding to the binary latent code, and update the state based on the selected animation data segment.

The processor may be configured to calculate the motion instability parameter based on the selected action, and update the state, in response to the motion instability parameter being less than or equal to a threshold.

The processor may be configured to generate an animation DB based on original animation data.

The processor may be configured to divide the original animation data into animation data segments, extract features corresponding to each of the animation data segments, generate binary latent codes corresponding to the features, cluster the animation data segments based on the binary latent codes, and calculate a mean feature of the animation data segments included in the same cluster.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

Figure 1:
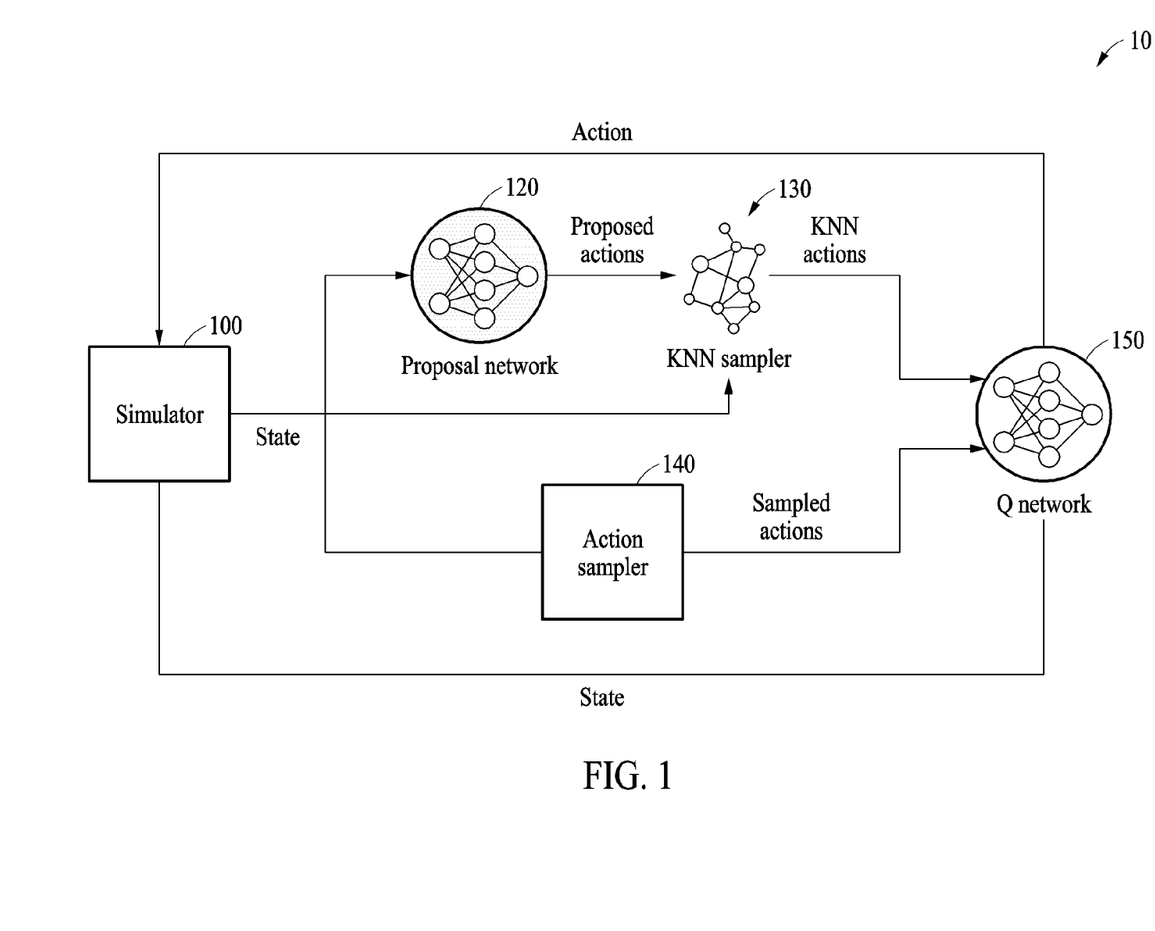
FIG. 1 illustrates an example of a character animation playing method.

FIG. 1 illustrates an example of a character animation playing method.

A character animation playing method 10 may generate a control policy that determines in real time an optimal motion for a virtual animation character to perform a task.

The character animation playing method 10 may construct, as a state, information associated with a current motion, an environment, and/or a goal of a character, construct, as an action, animation information to be applied to the character for a next unit time (e.g., 0.1 seconds), and infer an optimal action for a current state based on the control policy for each unit time to play an animation.

The state, s as indicated herein, may include a motion parameter p associated with joint information of the character, a binary latent code z corresponding to a currently playing animation data segment, a motion instability parameter d associated with a stability of a motion change of the character, and a goal parameter g associated with a task performed by the character. The state s may be expressed as in Equation 1 below.

$$s=\{p,z,d,g\} \quad \text{[Equation 1]}$$

The motion parameter p may include a local joint position $p_i$, a local joint orientation $q_i$, a local joint velocity $\dot{p}_i$, and a local joint rotational displacement $\dot{q}_i$. For example, the motion parameter p of a character with j-joints may be expressed as in Equation 2 below in which each of i and j denotes a natural number.

$$p=\{p_0,q_0,p_1,q_1,\ldots,p_j,q_j,\dot{p}_0,\dot{q}_0,\dot{p}_1,\dot{q}_1,\ldots,\dot{p}_j,\dot{q}_j\} \quad \text{[Equation 2]}$$

The binary latent code z may be a vector corresponding to an animation data segment to play a character animation. For example, an animation database (DB) may include animation data segments divided by a unit time, and each animation data segment may correspond to a binary latent code z. The state s may include the binary latent code z corresponding to a currently playing animation data segment.

The state s may also include a feature vector f corresponding to the animation data segment in place of the binary latent code z. The feature vector f may be extracted from each animation data segment.

The motion instability parameter d may be defined as a parameter that allows a natural motion change of the character. The motion instability parameter d may be defined based on a degree of a motion change of the character that occurs when there is a state transition. For example, for a state of which the motion instability parameter d is greater than a threshold, there may be no transition from a currently playing motion to another motion.

The goal parameter g may indicate the task performed by the character. For example, in a case in which the character is controlled to move to a position, the goal parameter g may be a coordinate (i.e., g={x,z}) that indicates a position of a target point, or in a case in which a moving direction of the character is controlled, the goal parameter g may indicate a target angle and a target velocity, for example, g={θ, v}.

An action a may include the binary latent code z. The binary latent code z included in the action a may be a binary latent code z corresponding to an animation data segment to be played during a next unit time. That is, there may be a transition of the state s when the binary latent code z of the state s is replaced with the binary latent code z of the action a.

The character animation playing method 10 may be performed by a simulator 100, a proposal network 120, a k-nearest neighbor (KNN) sampler 130, an action sampler 140, and a Q network 150. The simulator 100, the proposal network 120, the KNN sampler 130, the action sampler 140, and the Q network 150 described herein may be construed as being conceptually distinguished by each operation included in the character animation playing method 10, and not to be construed as hardware devices that are physically separated from each other. For example, the character animation playing method 10 may be performed as by a specifically-configured processor. In this example, the simulator 100, the proposal network 120, the KNN sampler 130, the action sampler 140, and the Q network 150 are implemented by hardware components. Each of these hardware components may each perform the operations described in this application by computing hardware, for example, by one or more processors or computers, executing instructions or software.

The simulator 100 may update a state based on an optimal action selected based on the state. The simulator 100 may provide a current state to the proposal network 120, the KNN sampler 130, and the action sampler 140, and enable a transition of the state based on an optimal action inferred by the Q network 150.

The proposal network 120 may extract a proposed action based on the state. The proposal network 120 may be trained to extract the proposed action to transition the state with reinforcement learning.

The KNN sampler 130 may extract KNN actions based on the proposed action. The KNN sampler 130 may extract actions that are similar to the proposed action and included in the animation DB using a KNN algorithm.

The action sampler 140 may extract sample actions based on the state. The action sampler 140 may sample actions corresponding to a similar motion to that of the character corresponding to the state.

The Q network 150 may select one action from actions included in the KNN actions and the sample actions based on the state. The Q network 150 may be trained to select the action that transitions the state from the KNN actions and the sample actions with reinforcement learning.

Figure 2:
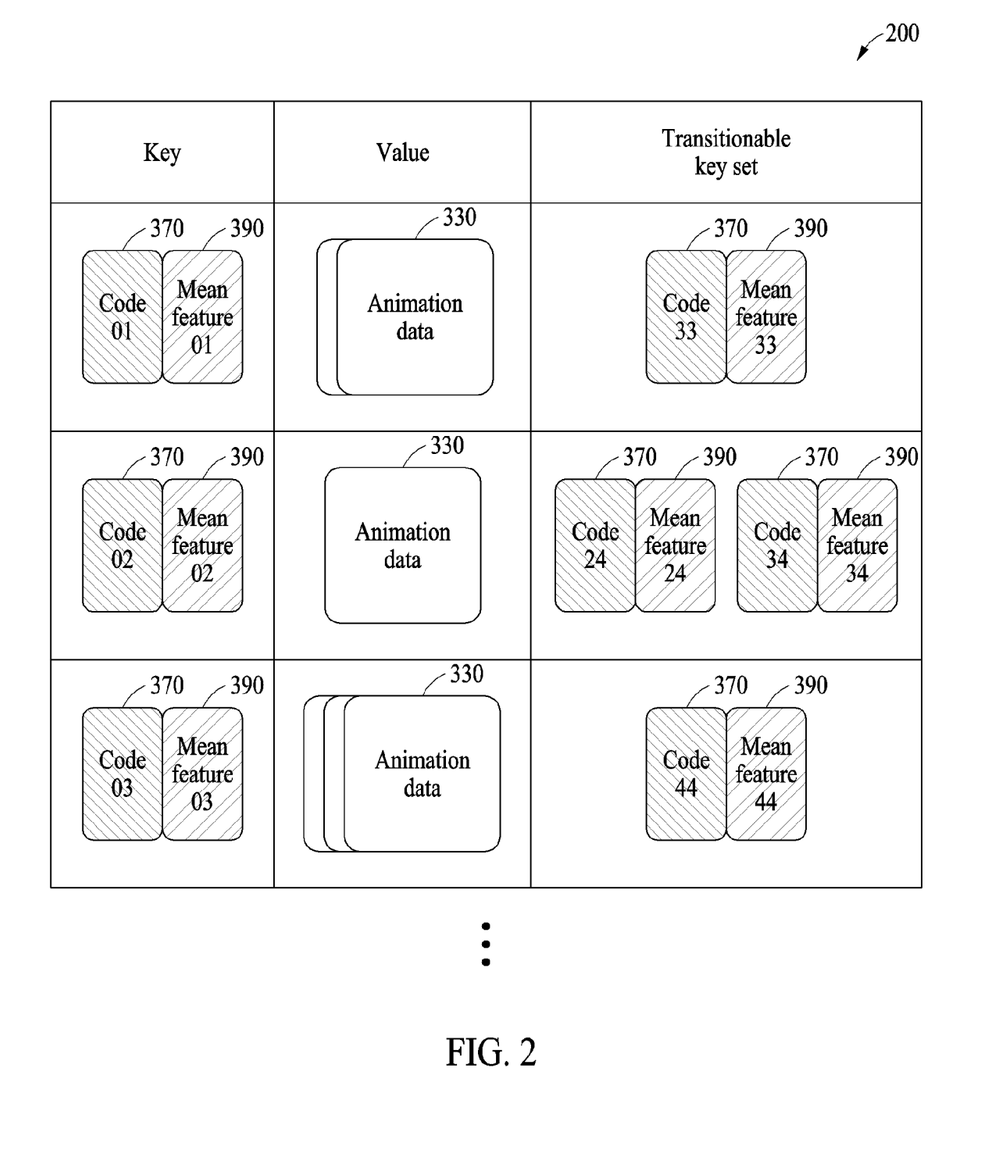
FIG. 2 illustrates an example of an animation database (DB).
Figure 3:
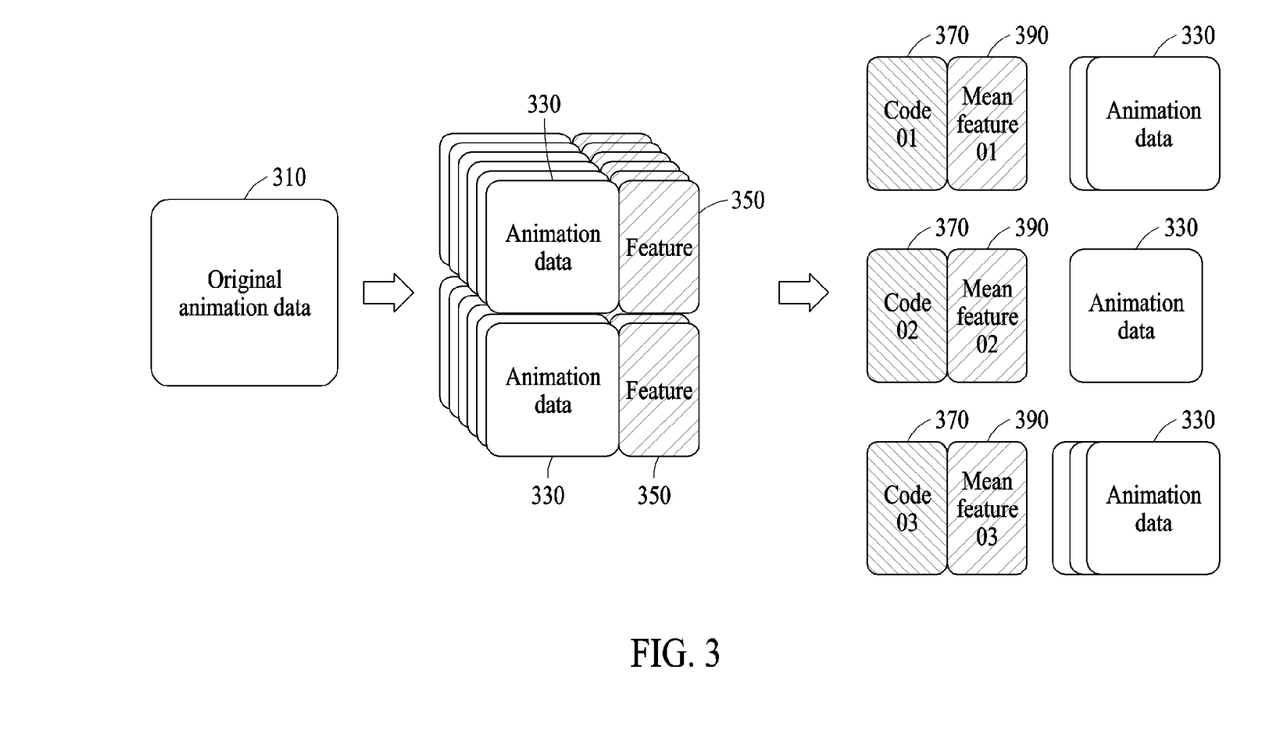
FIG. 3 illustrates an example of generating the animation DB.
Figure 4:
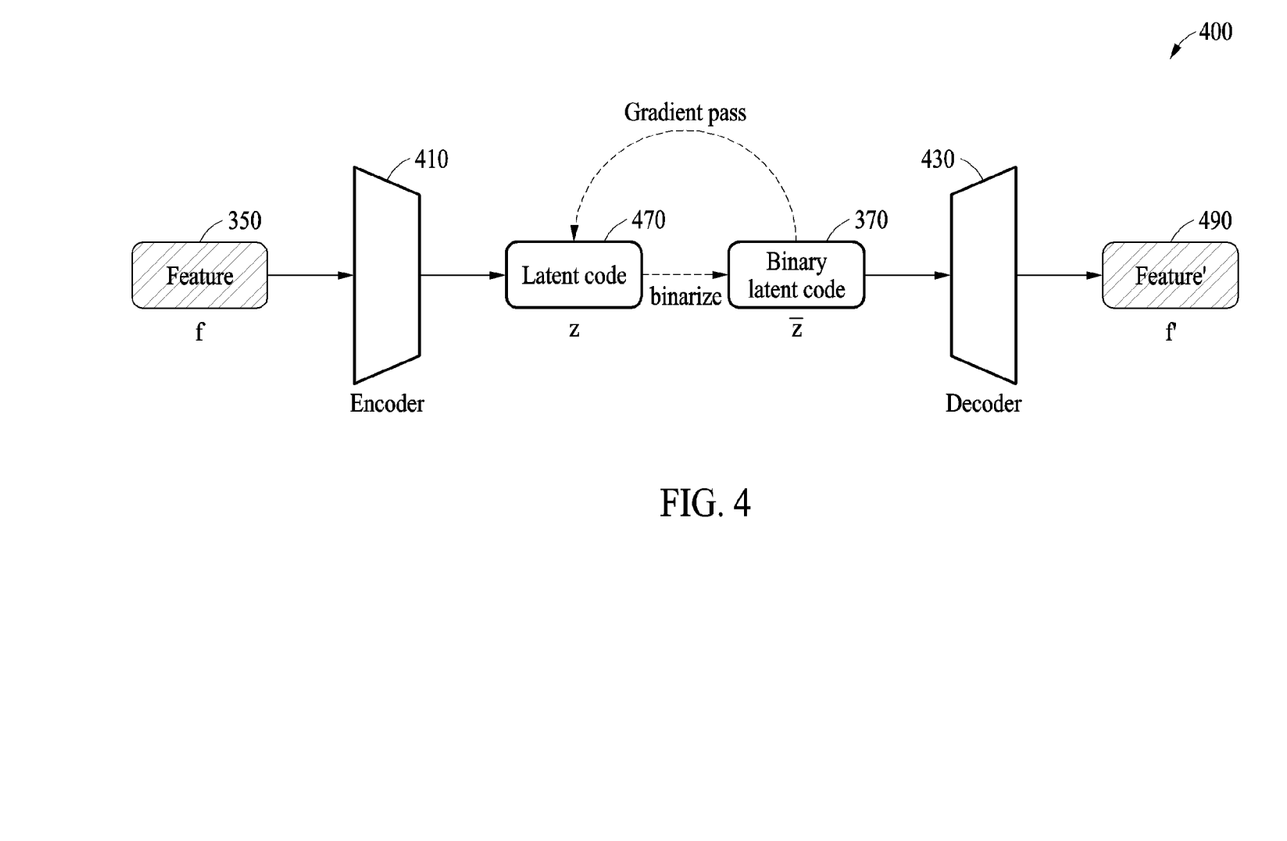
FIG. 4 illustrates an example of an autoencoder for generating a binary latent code.

FIG. 2 illustrates an example of an animation DB, FIG. 3 illustrates an example of generating the animation DB, and FIG. 4 illustrates an example of an autoencoder for generating a binary latent code.

An animation DB 200 used for the character animation playing method 10 may include animation data segments 330 that are divided from original animation data by a unit time (e.g., 0.1 seconds). The animation DB 200 may further include a key corresponding to the animation data segments 330 and a transitionable key set. The key may be a binary latent code 370 or a mean feature 390.

A feature 350 may be extracted from each of the animation data segments 330. The binary latent code 370 may be generated by the autoencoder 400 based on the feature 350.

The animation data segments 330 may be clustered based on the binary latent code 370. For example, the animation data segments 330 may form one cluster corresponding to the same binary latent code 370.

The mean feature 390 may be a mean of the feature 350 of the animation data segments 330 included in the same cluster. That is, one cluster may include at least one animation data segment 330 and have a corresponding binary latent code 370 and mean feature 390.

The transitionable key set may include keys of a cluster including transitionable animation data segments 330 that are similar to the animation data segments 330 included in the cluster. The transitionable key set may refer to a set of the binary latent code 370 and the mean feature 390 of a transitionable cluster.

The animation DB 200 may include a table for matching transitionable binary latent codes. The animation DB 200 may cluster the animation data segments 330 based on the binary latent code 370 and match a corresponding key and transitionable key set to each cluster.

The autoencoder 400 may generate the binary latent code 370 based on the feature 350. The autoencoder 400 may include an encoder 410 and a decoder 430. The encoder 410 may generate a latent code 470 based on the feature 350. The latent code 470 may be binarized to the binary latent code 370, and the decoder 430 may then restore a feature 490 based on the binary latent code 370. In an example, an operation of the autoencoder 400 may be expressed as in Equations 3 through 5 below.

$$Z_i = E(f(x_i)) = \text{sigmoid}(W_2 \varphi(W_1 \varphi(W_0(x_i)+b_0)+b_1)+b_2) \quad \text{[Equation 3]}$$

$$f_i' = D(\overline{Z}_i) = W_5 \phi(W_4 \phi(W_3(\overline{Z}_i)+b_3)+b_4)+b_5 \quad \text{[Equation 4]}$$

$$\overline{Z}_i = \text{binarize}(Z_i) \quad \text{[Equation 5]}$$

In Equations 3 through 5, E and D denote the encoder 410 and the decoder 430, respectively. $x_i$ denotes an i-th animation data segment 330. $Z_i$ and $\overline{Z}_i$ denote the latent code 470 and the binary latent code 370, respectively, generated based on the i-th animation data segment 330. $f_i'$ denotes the restored feature 490. $W_1$ through $W_5$, and $b_1$ through $b_5$ denote weight and bias values of a neural network, respectively. φ denotes a nonlinear activation function. A binarize function refers to a function that indicates 1 when an input value is greater than 0.5 and indicates 0 otherwise.

The autoencoder 400 may be trained to minimize a difference between the feature 350 and the restored feature 490 and a loss of information. For example, the autoencoder 400 may be trained based on a loss function L as expressed in Equation 6 below.

$$L = \|f(x_i) - f_i'\| + Wz|Z_i - \overline{Z}_i| \quad \text{[Equation 6]}$$

Figure 5:
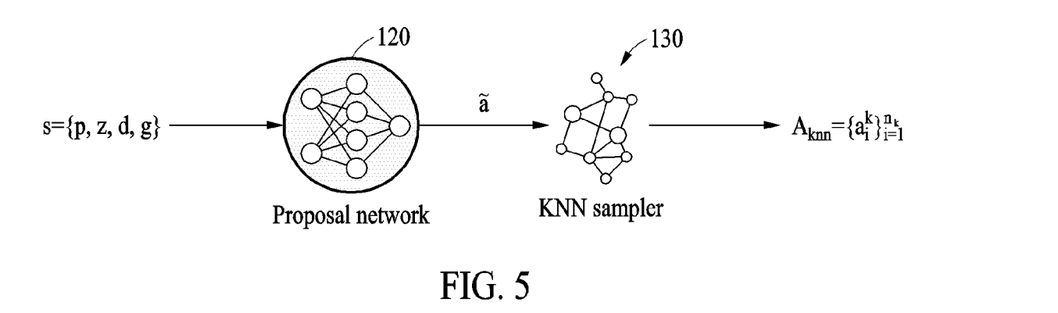
FIG. 5 illustrates an example of an operation of a proposed network and a k-nearest neighbor (KNN) sampler.
Figure 6:
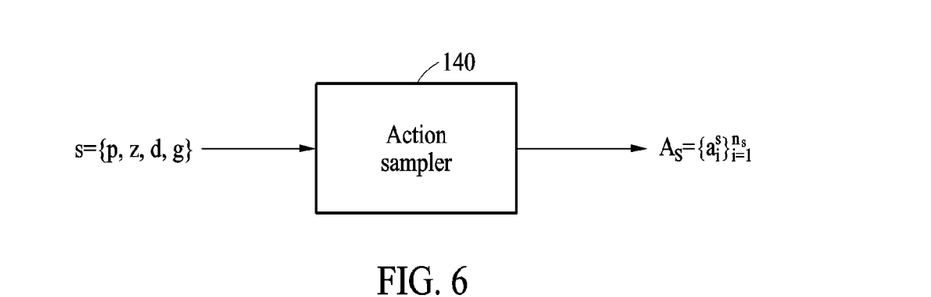
FIG. 6 illustrates an example of an operation of an action sampler.
Figure 7:
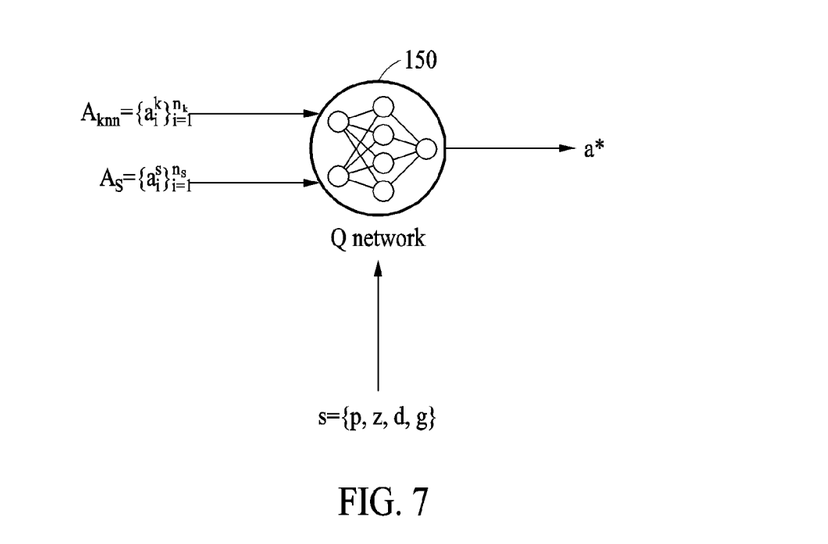
FIG. 7 illustrates an example of an operation of a Q network.

FIG. 5 illustrates an example of an operation of the proposed network 120 and the KNN sampler 130, FIG. 6 illustrates an example of an operation of the action sampler 140, and FIG. 7 illustrates an example of an operation of the Q network 150.

In an example, the proposal network 120 may return a proposed action ẽt based on a state (i.e., s={p,z,d,g}) and a proposed network parameter $θ_p$. For example, the proposed network parameter $θ_p$ may include weight values and bias values of the proposed network 120.

The KNN sampler 130 may return KNN actions (i.e., $A_{knn} = \{a_i^k\}_{i=1}^{n_k}$) based on the proposed action ã. For example, the KNN sampler 130 may return actions in the animation DB 200 having a distance $\|\tilde{a}-a\|_2$ from the proposed action $\tilde{a}$ that is less than or equal to a threshold using the KNN algorithm. In this example, $n_k$ denotes the number of KNN actions.

The action sampler 140 may return sample actions (i.e., $A_s=\{a_i^s\}_{i=1}^{n_s}$) that are similar to a binary latent code z included in the state s={p, z, d, g}. In an example, the sample actions $A_s=\{a_i^s\}_{i=1}^{n_s}$ may correspond to transitionable keys corresponding to the binary latent code z in the animation DB 200. The sample actions $A_s=\{a_i^s\}_{i=1}^{n_s}$ may be actions including the binary latent code z arranged by the transitionable keys.

The Q network 150 may return an action a* based on the KNN actions $A_{knn}=\{a_i^k\}_{i=1}^{n_k}$, the sample actions $A_s=\{a_i^s\}_{i=1}^{n_s}$, and a Q network parameter $\theta_q$. The Q network parameter $\theta_q$ may include weight and bias values of the Q network 150. The Q network 150 may calculate a Q-value for actions included in the KNN actions $A_{knn}=\{a_i^k\}_{i=1}^{n_k}$ and the sample actions $A_s=\{a_i^s\}_{i=1}^{n_s}$ based on the state s={p, z, d, g}, and return an action corresponding to the biggest Q-value.

The proposal network 120 and the Q network 150 may be trained such that the action a* optimal for a state transition is returned through reinforcement learning. The proposal network parameter $\theta_p$ and the Q network parameter $\theta_q$ may be updated based on a reward function. For example, the proposal network 120 and the Q network 150 may be trained with amortized Q-learning (AQL).

Figure 8:
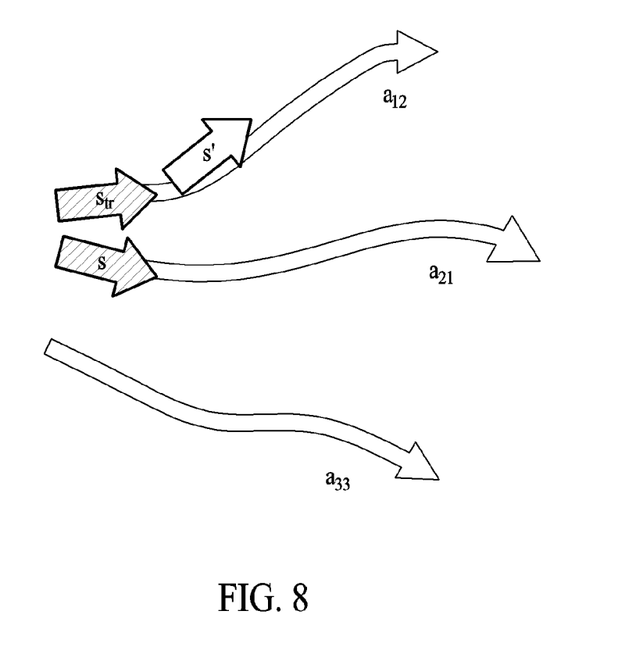
FIG. 8 illustrates an example of a state transition.

FIG. 8 illustrates an example of a state transition.

The simulator 100 may transition a state based on an action. The simulator 100 may search for a binary latent code 370 included in the action from the animation DB 200 and return animation data segments 330 corresponding to the binary latent code 370. The simulator 100 may transition the state to the most similar pose to a current pose of a character in the returned animation data segments 330.

In the example of FIG. 8, an action $a_{12}$ is selected and a state s is transitioned to a state $s_{tr}$. In this example, the simulator 100 may search for a binary latent code z included in the action $a_{12}$ from the animation DB 200 and obtain corresponding animation data segments $X_z=\{x_i^z\}_{i=1}^{N_z}$.

The simulator 100 may calculate a motion parameter $P_z=\{p_i^z\}_{i=1}^{N_z}$ of the character associated with the animation data segments $X_z=\{x_i^z\}_{i=1}^{N_z}$.

The simulator 100 may determine an optimal animation data segment $x_{i*}$ from among animation data segments $X_z=\{x_i^z\}_{i=1}^{N_z}$ based on the motion parameter $P_z=\{p_i^z\}_{i=1}^{N_z}$. i*, which may be expressed as in Equation 7 below.

$$i^*=\mathrm{argmin}_{i\in[1,N_z]}D(p,p_i^z) \quad \text{[Equation 7]}$$

D in Equation 7, which denotes a function indicating a difference between motions, may be defined as expressed in Equation 8 below.

$$D(p_1,p_2)=\|p_1-p_2\|_2 \quad \text{[Equation 8]}$$

The state $s_{tr}$ may be determined based on the optimal animation data segment $x_{i*}$. That is, the state $s_{tr}$ may be a state obtained as a binary latent code of the state s is replaced with a binary latent code corresponding to the animation data segment $x_{i*}$.

A state s'={m', z', d', g'} may be a state after the state $s_{tr}$ is played for a unit time. As expressed in Equation 9 below, a motion instability parameter d' may be calculated based on a difference D between changing motions, and the simulator 100 may transition a state when the motion instability parameter d' is less than or equal to a threshold. For example, as illustrated, when the motion instability parameter d' is less than or equal to the threshold, there may be a transition of the state s to the action $a_{12}$ that is different from a current playing action $a_{21}$. In Equation 9, each of $\tau$ and $\beta$ denotes a constant.

$$d'=\max\left(d+\frac{D}{\tau}-\beta,0\right) \quad \text{[Equation 9]}$$

Figure 9:
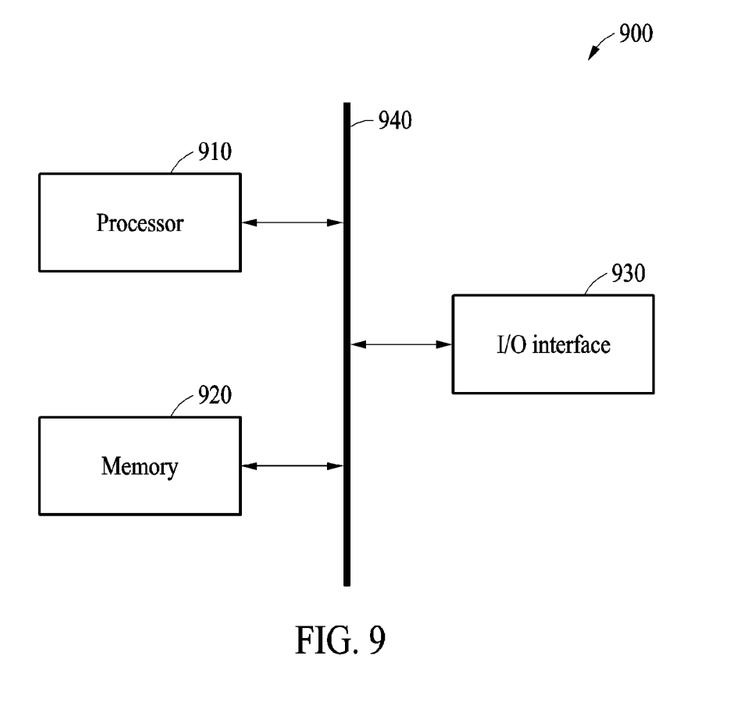
FIG. 9 illustrates an example of a character animation playing device.

FIG. 9 illustrates an example of a character animation playing device 900.

A character animation playing device 900 may perform the character animation playing method 10 described above. The character animation playing device 900 may include a processor 910, a memory 920, and an input and output (I/O) interface 930. The processor 910, the memory 920, and the I/O interface 930 may be connected to one another through a bus 940. In an example, the character animation playing device 900 may be used to provide a remote lecture service.

In an example, the memory 920 may store data for performing character animation and information received through the I/O interface 930. The memory 920 may also store instructions (or programs) executable by the processor. For example, the instructions may include instructions to perform an operation of the processor and/or an operation of each element of the processor. The memory 920 may include a volatile memory and a non-volatile memory.

The volatile memory device may be implemented as a dynamic random access memory (DRAM), a static random access memory (SRAM), a thyristor RAM (T-RAM), a zero capacitor RAM (Z-RAM), or a Twin Transistor RAM (TTRAM).

The non-volatile memory device may be implemented as a hard disk, an electrically erasable programmable read-only memory (EEPROM), a flash memory, a magnetic RAM (MRAM), a spin-transfer torque (STT)-MRAM, a conductive bridging RAM (CBRAM), a ferroelectric RAM (Fe-RAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further description of the memory 920 is given below.

In an example, the memory 920 may include a DB generated using one or more hard disks, and store various sets of data in the DB.

The processor 910 may process data stored in the memory 920. The processor 910 may execute instructions induced by a computer-readable code (e.g., software) stored in the memory 920 and instructions induced by the processor 910.

The processor 910 may be a hardware-implemented data processing device having a physically structured circuit for executing desired operations. For example, the desired operations may include instructions or a code in a program.

The hardware-implemented generation apparatus may include, for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. Further description of the processor 910 is given below.

The character animation playing method 10 performed by the character animation playing device 900 is described in detail with reference to FIGS. 1 to 8, and are incorporated herein by reference. Thus, the above description may not be repeated here for brevity.

The character animation playing device, simulator 100, proposal network 120, KNN sampler 130, action sampler 140, Q network 150, and other apparatuses, devices, units, modules, and components described herein with respect to FIG. 9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The method illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the character animation playing method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A character animation playing method, comprising:
   determining a proposed actions based on current state parameters of a character, and extracting first candidate actions from a stored set of actions based on similarity of the first candidate actions to the proposed action;
   extracting second candidate actions based on, according to the current state parameters, similarity of motion of the second candidate actions to current motion of the character indicated by the current state parameters;
   selecting a next action for the character from among the first candidate actions and the second candidate actions; and
   updating the current state parameters based on the selected next action.

2. The method of claim 1, wherein the current state parameters comprise:
   a motion parameter associated with joint information of the character;
   a code corresponding to an animation data segment of the current state of the character;
   a motion instability parameter associated with a stability of a motion change of the character; and
   a goal parameter associated with a task performed by the character.

3. The method of claim 1, wherein the first candidate actions and the second candidate actions comprise respective codes identifying respective animation data segments divided by a time unit.

4. The method of claim 1, wherein the extracting of the first candidate actions comprises:
   obtaining the proposed action from a neural network based on the current state parameters and a code; and
   extracting the first candidate actions based on similarity thereof to the proposed action as indicated by k-nearest neighbor (KNN) algorithm.

5. The method of claim 1, wherein the extracting of the second candidate actions comprises:
   extracting the second candidate actions based on a table matching transitionable codes.

6. The method of claim 1, wherein the updating comprises:
   searching for a code associated with the selected next action from an animation database (DB);
   selecting an animation data segment corresponding to the code; and
   updating the current state parameters based on the selected animation data segment.

7. The method of claim 2, wherein the updating comprises:
   calculating the motion instability parameter based on the selected next action; and
   updating the current state parameters in response to the motion instability parameter being less than or equal to a threshold.

8. The method of claim 2, further determining whether to omit the updating of the current state parameters by comparing the motion instability parameter to a threshold.

9. The method of claim 1, further comprising:
   generating an animation DB based on original animation data, wherein the updating is based on the animation DB.

10. The method of claim 9, wherein the generating comprises:
    dividing the original animation data into animation data segments;
    extracting features corresponding to each of the animation data segments;
    generating binary latent codes corresponding to the features;
    clustering the animation data segments based on the binary latent codes; and
    calculating a mean feature of the animation data segments included in the same cluster.

11. A non-transitory computer-readable storage medium storing instructions that, when executed by a processor, cause the processor to perform the method of claim 1.

12. A character animation playing device, comprising:
    a processor;
    memory storing instructions configured to, when executed by the processor, cause the processor to:
       determine a proposed action based on current state parameters of a character, and extract first candidate actions from a stored set of actions based on similarity of the first candidate actions to the proposed action;
       extract second actions based on, according to the current state parameters, similarity of motion of the second candidate actions to current motion of the character indicated by the current state parameters;

select a next action for the character from among in the first actions and the second actions; and update the current state parameters based on the selected next action.

13. The device of claim 12, wherein the current state parameters comprises:

a motion parameter associated with joint information of the character;

a code corresponding to an animation data segment of the current state of the character;

a motion instability parameter associated with a stability of a motion change of the character; and a goal parameter associated with a task performed by the character.

14. The device of claim 12, wherein the first candidate actions and the second candidate actions comprise respective codes identifying respective playable animation data segments.

15. The device of claim 12, wherein the instructions are further configured to cause the processor to:

obtain a proposed action from a neural network based on a code; and extract the first candidate actions based on similarity thereof to the proposed action according to a k-nearest neighbor (KNN) algorithm.

16. The device of claim 12, wherein the instructions are further configured to cause the processor to:

extract the second candidate actions based on a table matching transitionable codes.

17. The device of claim 12, wherein the instructions are further configured to cause the processor to:

search for a code associated with the selected next action from an animation database (DB);

select an animation data segment corresponding to the code; and update the current state parameters based on the selected animation data segment.

18. The device of claim 13, wherein the instructions are further configured to cause the processor to:

calculate the motion instability parameter based on the selected next action; and update the current state parameters in response to the motion instability parameter being less than or equal to a threshold.

19. The device of claim 12, wherein the instructions are further configured to cause the processor to:

generate an animation DB based on original animation data, wherein the updating is based on the animation DB.

20. The device of claim 19, wherein the instructions are further configured to cause the processor to:

divide the original animation data into animation data segments;

extract features corresponding to each of the animation data segments;

generate binary latent codes corresponding to the features;

cluster the animation data segments based on the binary latent codes; and calculate a mean feature of the animation data segments included in the same cluster.

* * * * *